United States Patent [19]
Wood et al.

[11] Patent Number: 5,453,942
[45] Date of Patent: Sep. 26, 1995

[54] WHEEL SPIN SPEED PROCESSING SYSTEM FOR MULTIPLE-AXLE RAILWAY VEHICLES

[75] Inventors: James A. Wood, Spartanburg, S.C.; John W. Drake, Cincinnati, Ohio; Paul E. Jamieson, Greer, S.C.

[73] Assignee: Westinghouse Air Brake Company, Wilmerding, Pa.

[21] Appl. No.: 254,734

[22] Filed: Jun. 6, 1994

[51] Int. Cl.$^6$ ............................................. G01P 3/00
[52] U.S. Cl. ............... 364/565; 364/426.02; 364/426.03; 246/168.1
[58] Field of Search ................. 364/565, 426.01, 364/426.02, 426.03, 426.04, 426.05; 246/168.1; 324/160; 361/236

[56] References Cited

U.S. PATENT DOCUMENTS

| | | | |
|---|---|---|---|
| 4,071,282 | 1/1978 | Callahan et al. | 303/106 |
| 4,922,447 | 5/1990 | Reichel | 364/561 |
| 4,972,145 | 11/1990 | Wood et al. | 324/160 |
| 4,987,543 | 1/1991 | Wood et al. | 364/426.03 |
| 5,058,019 | 10/1991 | Litkouhi | 364/426.02 |
| 5,065,327 | 11/1991 | Yahagi et al. | 364/426.02 |
| 5,099,443 | 3/1992 | Higashimata et al. | 364/565 |
| 5,179,526 | 1/1993 | Zimmer et al. | 364/565 |
| 5,244,171 | 9/1993 | Drake et al. | 246/168.1 |
| 5,290,095 | 3/1994 | Wood et al. | 303/92 |
| 5,299,131 | 3/1994 | Haas et al. | 364/426.03 |
| 5,373,447 | 12/1994 | Howes et al. | 364/426.03 |

*Primary Examiner*—Ellis B. Ramirez
*Assistant Examiner*—Patrick J. Assouad
*Attorney, Agent, or Firm*—John B. Sotak

[57] ABSTRACT

A vehicle-in-spin speed processing system for multiple wheel axle units of a self-powered railway vehicle in which a reasonably accurate vehicle speed reference signal is produced as the wheel axle units are experiencing wheel spin during acceleration of the self-powered railway vehicle so that a minimum amount of error occurs in the output data of speedometers, odometers, and event recorders.

19 Claims, 3 Drawing Sheets

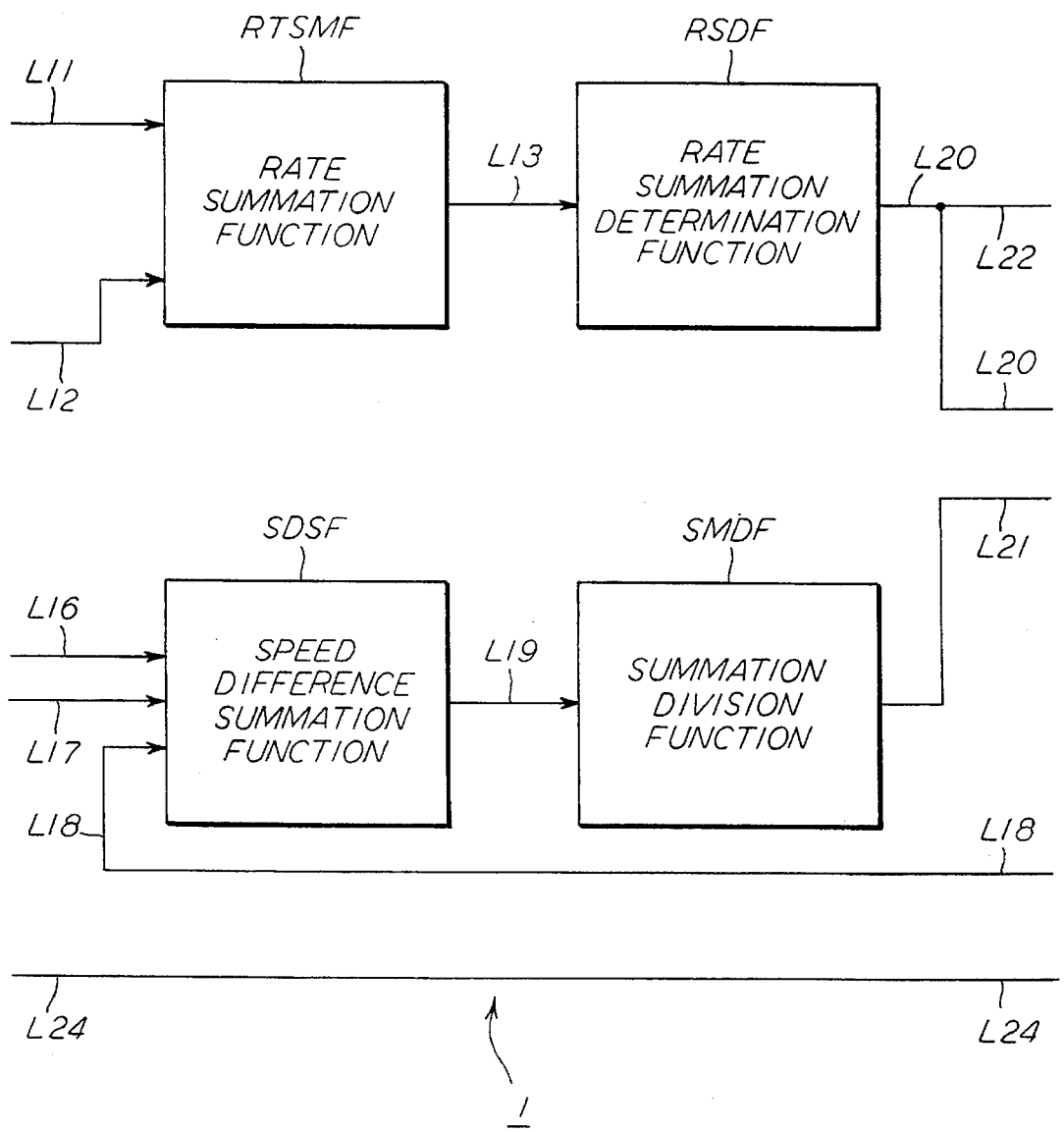
FIG. IB

WHEEL SPIN SPEED PROCESSING SYSTEM FOR MULTIPLE-AXLE RAILWAY VEHICLES

FIELD OF THE INVENTION

This invention relates to an electronic system for determining when a vehicle is in a wheel spin condition, and more particularly, a vehicle-in-spin speed processing arrangement for sensing and detecting when all wheel axle units on a railway vehicle are experiencing wheel spin during acceleration of the railway vehicle.

BACKGROUND OF THE INVENTION

It has been found that in certain transportation systems, such as in modern transportation systems, such as in railway and/or mass or rapid transit operations, there is a need for providing improved wheel spin sensing and detecting apparatus for more accurately determining the actual speed and the exact distance that the railway train has traveled as it proceeds along its route of travel. The mandated use of event recorders on railroad lead locomotives and on any self-powered transit vehicle has made it necessary to provide an accurate record of speed, distance, time, direction, etc., in case of an accident or equipment failure. Previously, the conventional speedometer and odometer circuits were generally connected to a single axle of a multiple-axle railway vehicle. If this selected axle is spinning, there is a significant chance an error will occur in the speed and distance records. That is, the speed signal of the spin wheel being read is much higher than the actual velocity of the accelerating train so that the recorded data does not reflect the exact speed and distance of travel. Thus, the recorded data was unreliable and was of little use in aiding accident analysis and in monitoring engineers' performances or in observing the operation of the equipment. Hence, the usefulness of event recorders to provide data that is exempt from prejudice, free from errors of human observances and untainted from the possibility of self-interest is compromised by equipment that simply employs a single-axle sensor for detecting wheel spin.

OBJECTS AND SUMMARY OF THE INVENTION

Accordingly, it is an object of this invention to provide a new and improved wheel spin processing system which more effectively monitors the speed of a multiple-axle vehicle.

Another object of this invention is to provide a vehicle-in-spin speed algorithm processing arrangement which, during situations when all the wheel axle units on a railway vehicle are experiencing wheel spin during acceleration, provides a relatively accurate reference speed signal.

A further object of this invention is to provide a unique microprocessor base control system which utilizes the minimum axle speed output on a multi-axle vehicle when the minimum axle speed does not signify a wheel spin condition.

Yet another object of this invention is to provide a vehicular speed control arrangement employing an acceleration rate storage procedure to determine if the minimum axle speed signal indicates a spin condition in order to ascertain whether there is a need to provide a calculated speed reference during acceleration of the railway vehicle.

Yet a further object of this invention is to provide an independent wheel spin sensing and detecting system which is independent of the particular type of wheel spin propulsion control system presently used on railway vehicles.

Yet another object of this invention is to provide an independent wheel spin sensing and detecting system which, at a succession of time steps, utilizes tachometer data from the axles at the present time step and at previous time steps to determine whether wheel spin is occurring and to provide a calculation of the actual vehicle speed at the present time step.

Still another object of this invention is to provide a wheel spin processing system for multiple-axle railway vehicles comprising, first means for receiving speed and rate of change signals from at least four wheel axle units and for determining which one of the four wheel axle units is rotating at the lowest speed, second means for receiving a lowest speed and rate of change signals from the first means and for producing a first logical signal when the rate of change signal value is greater than a speed varying set point value, third means for estimating the spin energy value of the lowest speed wheel axle unit and for summing the present rate value and each successive rate value, in the event that the first logical signal from the second means indicates that wheel spin is occurring, fourth means for using the summed rate value to determine a logical signal which indicates that a prolonged wheel spin condition is occurring, a fifth means for converting an eight-bit speed signal to a sixteen-bit speed signal, sixth means for calculating the speed difference between the present sixteen-bit speed signal and the sixteen-bit speed signal from the previous time step, seventh means for placing said speed difference in memory, storing the values from successive time steps in 32 memory locations, shifting these values backwards and discarding the oldest value, summing the speed differences stored in the 32 memory locations multiplied by an efficiency factor which depends on whether a spin control function is in effect, eighth means for dividing the output of the seventh means by thirty-two, ninth means connected to the fourth and eighth means for holding a modified average speed difference value, tenth means for determining a sixteen-bit reference signal, eleventh means for outputting a signal which is the difference of a previous time interval value and a present time interval valve, and twelfth means for converting the sixteen-bit reference signal to an eight-bit reference signal.

An additional object of this invention is to provide a thirteenth means which detects an axle acceleration less than zero, which indicates that a wheel spin control system is in effect, the thirteenth means providing a logical signal which indicates that condition.

An additional object of this invention is to provide a fourteenth means, an efficiency factor determination function which receives the logical signal from the thirteenth means, and also receives a power knockout logical signal and a spin detect logical signal from a spin control system, combines these signals in an or-gate to provide a logical signal which indicates that spin correction is occurring, this logical signal being used by the seventh means to select an efficiency factor.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIGS. 1A, 1B and 1C illustrate a schematic circuit block diagram, which when placed in side-by-side relationship, namely, when FIG. 1A is disposed on the left side, FIG. 1B is disposed in the center, and FIG. 1C is disposed on the right side of a wheel spin speed control processing arrangement for a multiple-axle railway vehicle in accordance with the present invention.

DETAILED DESCRIPTION OF THE INVENTION

Figure 1A:
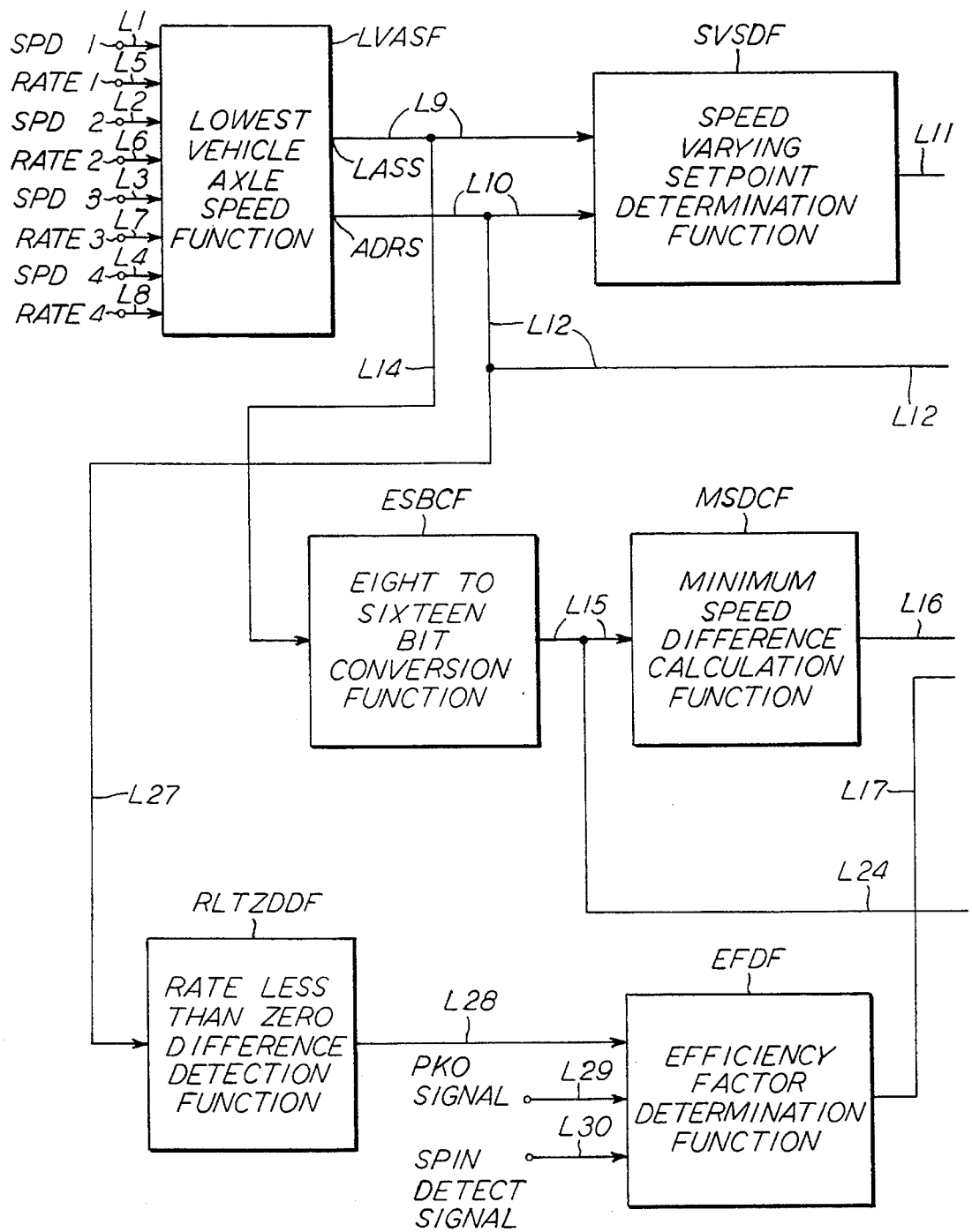
Figure 1C:
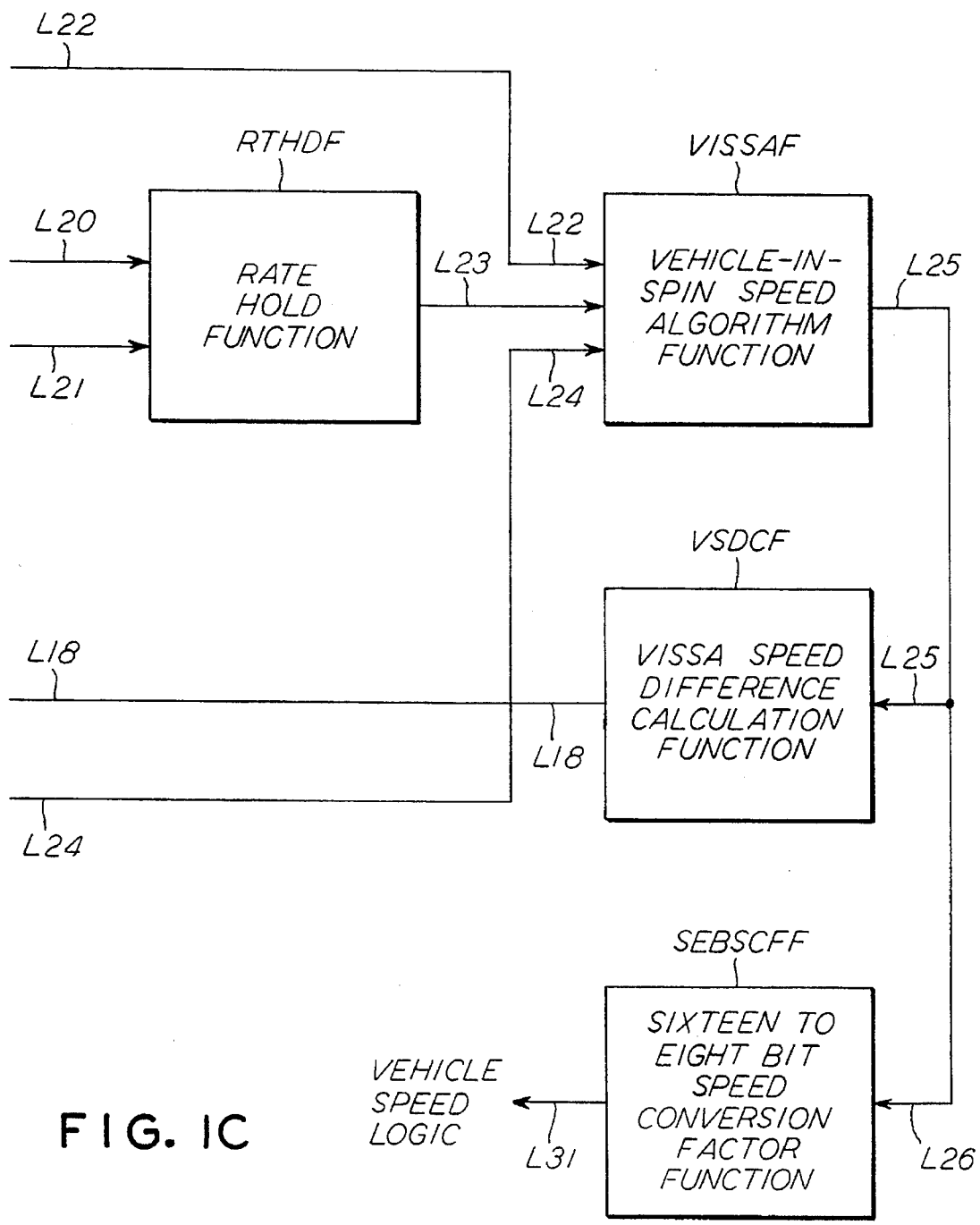

Referring now to the FIGS. 1A, 1B and 1C of the drawings, there is shown a vehicle-in-spin algorithm control system employing a binary mathematical process for determining with reasonable accuracy the actual speed reference signal when all the wheels on a multiple-axle vehicle are spinning during acceleration. In most cases, the railway vehicles used in mass and/or rapid transit operations are two-truck, four-axle, self-powered cars.

In operation, the speed of each of the four-wheel axle units is sensed and measured by a separate associated magnetic pickup device or sensor which may take the form of a conventional tachometer generator. Each of the tachometer generators is disposed in close proximity to a toothed wheel which is driven by each of the four-wheel axle units. Thus, the magnetic generator senses the speed of the passing teeth of the driven gears to produce electrical signals or pulses which have a frequency proportional to the angular rotation of the respective gears. That is, the tachometer generators produce alternating current signals having a frequency which varies with the rotating speed or velocity of the respective wheel axle units. It will be appreciated that the output signal of each of the four magnetic pickup devices or sensors is connected to the input of a respective one of four suitable velocity measuring circuits. Each of the velocity measuring circuits is basically a converter which includes a pulse shaper, counters and buffer latches. It will be appreciated that the a.c. signals are fed to the pulse shaper which produces constant-amplitude square-wave pulses which have a repetition rate proportional to the input frequency. Next, the square-wave pulses are fed to a gating circuit which allows a high frequency clock input to the counters to produce an output which is inversely proportional to the frequency of the particular wheel axle unit being monitored. Then, the velocity count signals are fed to buffer latches which provide the necessary stabilization and isolation. It will be understood that the output of each of the four speed or velocity measuring circuits is connected to the input of a respective one of four differentiating measuring circuits each of which operates in a well known manner to perform a time derivation for obtaining a rate signal.

As shown in FIGS. 1A and 1B, the electronic vehicle-in-spin speed algorithm processing system is generally characterized by numeral 1 includes an eight input lowest vehicle axle speed function circuit LVASF. It will be noted that the outputs of the four velocity measuring circuits are connected to the respective speed input terminals SPD1, SPD2, SPD3 and SPD4 of the lowest vehicle axle speed function circuit LVASF via leads L1, L2, L3 and L4, respectively. Likewise, the outputs of the four differentiating measuring circuits are connected to the respective rate input terminals Rate 1, Rate 2, Rate 3 and Rate 4 of the lowest vehicle axle speed function circuit LVASF via leads L5, L6, L7, and L8, respectively. The function of the lowest vehicle axle speed function circuit LVASF is to determine the lowest speed axle or slowest rotating wheel axle unit on the moving railway vehicle and also its corresponding acceleration/ deceleration rate signal. The lowest speed axle is the least likely to be a spin situation or alternatively at least the axle which is undergoing or experiencing the least amount of wheel spin. The lowest vehicle axle speed circuit LVASF compares the four speeds of the wheel axle units and performs a selection to determine which one of the four speeds is the lowest numerical value to signify the minimum axle speed output signal LASS. Further, lowest vehicle axle speed circuit LVASF also produces an acceleration/deceleration rate signal ADRS which corresponds to the rate of change of the minimum axle speed signal LASS.

As shown, the minimum axle speed signal LASS is connected to one input of a speed vary setpoint determination function circuit SVSDF via lead L9. The acceleration/ deceleration rate signal ADRS is connected to another input of the speed varying setpoint determination circuit SVSDF via lead L10. The speed varying setpoint determination function circuit SVSDF monitors the vehicle acceleration rate signal to determine if it is greater than a speed varying threshold level. Any given threshold level is determined by the maximum expected vehicle acceleration rate performance versus speed. As noted above, the speed varying setpoint determination function circuit outputs both the speed and rate signals LASS and ADRS. If the speed input signal LASS is greater than the speed varying setpoint, the speed varying setpoint determination function circuit will output a high or logical "1", and if not, the output will be a low or logical "0". The following table gives the speed varying setpoints at different speeds:

| LVAS IN MPH | SETPOINT IN MPHPS |
| --- | --- |
| < 8.0 | 5.6 |
| >= 8.0 & < 16.0 | 4.6 |
| >= 16.0 & < 24.0 | 3.6 |
| >= 24.0 & < 32.0 | 2.6 |
| >= 32.0 & < 40.0 | 2.0 |
| >= 40.0 & < 48.0 | 1.8 |
| > 48.0 | 1.6 |

It will be seen that the output of the speed varying setpoint determination function circuit SVSDF is connected to one input of a rate summation function circuit RTSMF via lead L11. The other input of the rate summation function circuit RTSMF is received from the acceleration/deceleration rate signal ADRS of the lowest vehicle axle speed function circuit LVASF via leads L10 and L12. The rate summation function circuit RTSMF is responsible for estimating the spin energy value of the lowest spinning wheel axle unit on the vehicle at any given time interval. The spin energy value is utilized to determine whether all of the wheels on the vehicle are in a spinning situation. Now when the signal on lead L11 is a logical "1", the rate summation function circuit RTSMF will start the summing of the existing rate value and will place each successive rate value into a memory storage. In a digital memory, the storage data must be at least sixteen (16) bits. During each summing operation, the rate summation function circuit RTSMF will subtract a selected tolerance factor, such as 1.2 MPHPS for each summation. The rate summation circuit RTSMF will continue the summing operation as long as the memory value is greater than zero or the signal of lead L11 is a high or logical "1", otherwise, the value of the memory will be set to zero.

It will be noted from FIG. 1B that the output of the rate summation function circuit RTSMF is connected to the input of a rate summation determination function circuit RSDF via lead L13. The rate summation determination circuit RSDF changes the varying magnitude signal received from the rate summation function circuit RTSMF to a digital signal. If the signal received from the rate summation function circuit RTSMF is greater than 4.0, the rate summation determination function circuit RSDF will output a high or logical "1" and if not, the rate summation determination function circuit RSDF will output a low or logical "0".

It will be seen in FIG. 1A that the minimum axle speed signal LASS is connected to an eight to sixteen-bit conversion function circuit ESBCF via leads L9 and L14. The function of the converter circuit ESBCF is to convert the eight (8) binary speed value derived from the minimum axle speed signal to a sixteen (16) binary value. The 8-bit binary input value is simply shifted eight (8) times to the left to produce the 16-bit binary speed value. The function of converting the 8-bit speed signal to a 16-bit speed signal is to increase to the degree of accuracy of the signal as it undergoes subsequent calculations.

It will be observed that the converted 16-bit speed signal is conveyed to the input of a minimum speed difference calculation function circuit MSDCF via lead L15. The minimum speed difference calculation circuit MSDCF calculates the difference between the 16-bit speed signal of the present time period and the 16-bit speed signal of the previous time period. In the present system, the time period is set at twenty-milliseconds (20 ms) intervals. The subtracted 16-bit speed signal is conveyed to the input of the speed difference summation function circuit SDSF via lead L16, while the 16-bit speed signal of the present time period is placed in memory and will be used in the subtractive calculation which will take place during the next time period.

The speed difference summation circuit SDSF functions to provide the summation of the present 16-bit speed signal derived from the minimum speed difference circuit MSDCF and thirty-one (31) of the speed signals of the previous time periods from the vehicle in accordance with a slip speed algorithm speed difference function. In addition, the speed difference summation function circuit SDSF is also responsible for multiplying an efficiency factor with the summation of the speed difference signals. The efficiency factor is determined on whether or not the vehicle is performing a wheel spin control function. It will be seen that the speed difference summation circuit SDSF receives a first input from the minimum speed difference calculation circuit MSDCF via lead L16, receives a second input from an efficiency factor determination function circuit EFDF via lead L17, and a third input is fed back from a VISSA speed difference calculation function circuit SDCF via lead L18. The 16-bit speed signal from the VISSA speed difference calculation circuit VSDCF is placed in position 1 of a thirty-two (32) position memory stack or storage unit. The position shifting of the 16-bit data is repeated all the way down the line to position 32, and the 16-bit data previously in position 32 is discarded. The current data value of the minimum speed difference calculation circuit MSDCF is added to the summation of VISSA speed difference calculation circuit VSDCF from positions 2 to 32. Now if the input from the efficiency factor determination function circuit EFRF is a high or logical "1", the data value of the summation is multiplied by a forty percent (40%) efficiency factor and appears as an output on lead L19. Conversely, if the input from the efficiency factor determination function circuit ERDF is a low or logical "0", the data value of the summation is multiplied by a ninety percent (90%) efficiency factor and appears on lead L19.

It will be understood that the summation division function circuit SMDF is responsible for dividing the summation of the speed difference summation value by the number of time periods that are to form the modified average speed difference calculation. As shown, the summation division function circuit SMDF receives its sole input from speed difference summation function circuit SDSF. The input is divided by 32 which can be performed by an actual division process or can be accomplished by five (5) binary shifts to the right.

As shown, one input of a rate hold function circuit RTHDF is connected to the output of the rate summation determination function circuit RSDF via lead L20, while the other input of the rate hold function circuit RTHDF is connected to the output of the summation division function circuit SMDF via lead L21. The rate hold function circuit RTHDF is responsible for holding or retaining the modified average speed difference value which is calculated at the beginning of a sequence in which the minimum axle speed on the vehicle is indicated as spinning. The hold function will remain in effect as long as the minimum axle speed on the vehicle remains in a spin condition. The rate hold function circuit RTHDF is set and reset depending on the inputs. If the input received from the rate summation determination function circuit RSDF undergoes a transition from a low or logical "0" to a high or logical "1", the rate hold function circuit RTHDF will hold the input value received from the summation division function circuit SMDF at the given time and will output it as long as the input from the rate summation determination function circuit RSDF remains in a logical "1" condition. Now when the input received from the rate summation determination function circuit RSDF undergoes a transition from a high or logical "1" to a low or logical "0" the rate hold function circuit RTHDF will output the present time step signal obtained from the summation division function circuit SMDF.

It will be noted that the outputs of the rate summation determination function circuit RSDF, the rate hold function circuit RTHDF, and the eight to sixteen (8 to 16) bit conversion function circuit ESBCF are connected to the three inputs of vehicle-in-spin speed algorithm function circuit VISSAF via leads 20 and 22, lead L23, and leads L15 and L24, respectively. The function of the vehicle-in-spin speed algorithm function circuit VISSAF is responsible for determining the 16-bit speed reference signal. During situations when the minimum speed axle on the vehicle is determined to be in a spin condition, the speed reference value will be calculated by adding the modified average speed value to the previous speed reference value calculation by the vehicle-in-spin speed algorithm function circuit VISSAF. Conversely, if the minimum speed axle is determined not to be in a spin condition, the minimum speed axle value will be outputted by the vehicle-in-spin algorithm function circuit VISSAF. That is, if the input received from the rate summation determination function circuit is a logical "1", the output from the vehicle-in-spin speed algorithm function circuit VISSAF is formed by the addition of the input received from the rate hold function circuit RTHDF to the previous output of the vehicle-in-spin speed algorithm function circuit VISSAF. Conversely, if the input received from the rate summation determination function circuit RSDF is a logical "0", the output of the vehicle-in-spin speed algorithm function circuit VISSAF is equal to the input received from the eight to sixteen (8 to 16) bit conversion function ESBCF.

It will be seen in FIG. 1C that the output of the vehicle-in-spin speed algorithm function circuit VISSAF is connected to the inputs of both the VISSAF speed difference calculation function circuit VSDCF and the sixteen to eight (16 to 8) bit speed conversion factor function circuit SEBSCFF via lead L25 and leads L25 and L26, respectively. The VISSAF speed difference calculation function circuit VSDCF calculates the difference between the present time period vehicle-in-spin speed algorithm produced 16-bit speed signal and the previous time period vehicle-in-spin speed algorithm produced 16-bit speed signal. Presently, a time period of twenty milliseconds (20 ms) is set between intervals. The value produced by the subtraction process is used as an output on lead L18, while the present time period signal is placed in memory for calculation during the next time period.

In viewing FIG. 1A, it will be noted that acceleration/ deceleration rate signal ADRS is connected to the input of the rate less than zero difference function circuit RLZDDF via leads L10, L12 and L27. The circuit RLTZDDF is responsible for determining if the decelerating rate of the minimum speed axle on the vehicle is less than zero (0) mphps. If the minimum speed axle rate is less than 0 mphps, it is an indication that the vehicle is in spin control mode of operation. The signal is of significant importance in determining the speed difference efficiency factor in those situations when the given system does not have access to the vehicle spin control logic signals. If the rate signal ADRS from the lowest vehicle axle speed function circuit is less than 0 mphps, the rate less than zero difference detection function circuit RLTZDDF will output a high or logical "1" on lead L28, and if not, the output will be low or logical "0".

Again, as shown in FIG. 1A, the output signal on lead L28 is connected to a first input of the efficiency factor determination function circuit EFDF which is responsible for determining the speed difference summation efficiency factor. When performed on a per-car basis, the spin control generally means the rapid reduction of the car propulsion force. During such a time period, the vehicle has a reduced capability to make full use of the maximum available adhesion level. The speed algorithm employs this function as a means of taking this fact into consideration. It will be seen that the second input fed to the efficiency factor determination function circuit EFDF is received from the power knockout circuit PKO which provides a digital signal either a logical "1" or logical "0" on lead L29, dependent upon whether or not a reduction of propulsion force is requested. The third input of the efficiency factor determination function circuit EFDF is received from spin detection circuit which provides a digital signal either a logical "1" or a logical "0" on lead L30 which is used to determine whether spin correction is either necessary or not necessary. If any one or more of these three inputs is a logical "1" the efficiency factor determination function circuit EFDF operates as a three-OR-gate and develops a logical "1" on lead L17.

In viewing FIG. 1C, it will be seen the output of the vehicle-in-spin speed algorithm function circuit VISSAF is connected to the input of a sixteen to eight (16 to 8) bit speed conversion factor function circuit SEBSCFF which is responsible for converting the 16-bit speed signal value to an 8-bit speed signal value. The binary conversion is accomplished by shifting the 16-bit speed signal 8 places to the right to produce an 8-bit speed signal which is conveyed to the vehicle speed control logic via lead L31.

Thus, it will be seen that the present system initially converts an 8-bit interface input number to an intermediate 16-bit number for calculation purposes and then reconverts the 16-bit intermediate number to an 8-bit output number when used with 8-bit wheel slip control arrangements. It will be recognized that the use of 16-bit mathematical calculations results in increased reference speed accuracy. In operation, the system employs the average axle speed signal developed on the vehicle when none of the wheel axle units is not experiencing a wheel spin condition. Such an operational procedure is made possible due to the fact that the proposed system may be used independently or in conjunction with the existing wheel spin control apparatus. During situations where all wheel/axle sets on the vehicle are experiencing wheel spin during acceleration, this process produces a reasonable accurate reference speed. The output of this process can be used for speedometers, odometers, data acquisition, and even as part of a wheel spin control process.

The following is a summation of the various functions that are achieved by the present vehicle-in-spin speed algorithm control and processing system:

First, the system initially converts 8-bit interface input numbers to 16-bit numbers for calculation purposes, and then reconverts to an 8-bit output when the invention is utilized with 8-bit microprocessor logic functions. The use of 16-bit mathematical calculations provides a greater degree of reference speed accuracy.

In operation, the interslip sequence speed control portion normally employs an 8-bit speed signal which is derived from an E7 or E7A type of wheel slip controller of the vehicle control system. Under these circumstances, the speed range varies from 0 to 127.5 mph, which corresponds to 0 to 255 bits. As noted above, the time period between intervals is 20 ms, which is not uncommon for the program cycle of an 8-bit microprocessor-based wheel slip controller. In all practicality, the simple conversion to a 16-bit mathematical operation is not totally responsible for the increase in accuracy. The increase in accuracy is realized by maintaining the constant formation, the subtraction of the constants, as well as the subtraction of the held value from the held speed, all of which are performed in the realm of 16-bit math. It will be appreciated that, if the same process was performed in 8-bit math, the use of the minimum axle rate constant would have a limited effectiveness.

For example, let us assume that the railway vehicle is decelerating at a rate of 2.00 mphps just prior to the time that all the axles on the vehicle go into a slip condition. It will be appreciated that over the entire program cycle, namely, during each of the thirty-two (32) time periods, over which the difference summation output is calculated, the actual speed signal will drop by 1.28 mph. In an 8-bit mathematical operation, this will be equivalent to three (3) bits, when rounded to the nearest bit. Conversely, in a 16-bit mathematical operation, this will be seven hundred and seventy-one (771) bits when rounded to the nearest bit.

Generally, at the beginning of the computing procedure, there is little or no difference between the two approaches. Next, during the constant formation, it will be appreciated that there are only four (4) possible constants which can be formed in an 8-bit system. It will be noted that, in this assumed case, it is possible to subtract 0 bits, 1 bit, 2 bits or 3 bits, so that the four deceleration rates are limited to 2.34 mphps, 1.56 mphps, 0.78 mphps and 0.00 mphps. Conversely, in a 16-bit system, it is possible to subtract from 0 to 771 bits. Accordingly, when the resultant value is reconverted, the possible number of deceleration variables is proportionally increased in accordance with the period of time that all the vehicular axles are continuing to slip in an increased manner. Thus, it will be understood that the number of constant values and the corresponding number of variables that are produced can be varied dependent upon the particular vehicle application. It will be appreciated that without the use of 16-bit math, the ability to accurately approximate long periods of time when all the axles are slipping is virtually impossible. Accordingly, with 16-bit math, it is possible to accurately approximate long periods of time when all axles are slipping, which is most critical.

Second, the system uses the minimum axle speed on the car as output when this minimum axle speed does not indicate a spin condition.

Third, the subject system uses an acceleration rate storage, namely, estimates axle spin energy procedure to determine if the minimum axle speed indicates a spin. This provides an accurate detection for the need to provide a calculated speed reference during acceleration.

Fourth, the present process uses a feedback of its own calculated speed reference to produce the historical part of the average acceleration calculation. This reduces calculation errors due to wheel spin affected minimum axle speed data.

Fifth, the subject process also forms its average acceleration data based on the spin correction efficiency constraints. These constraints can be based on any combination of three determination methods. This allows for consistent performance whether or not the logic performing this process is responsible for the car spin control system.

Sixth, the process is completely independent of the type of existing spin control used on the vehicle due to the use of its own independent spin detection process.

Seventh, the procedure uses simple binary mathematical processes aimed at reducing both processing time and either the number of hardware components or software complexity of the memory.

In addition, it reduces the errors in speedometer operations due to wheel spin, it reduces the errors in odometer operations due to seasonal poor adhesion condition, and it improves the ability of detecting wheel spin conditions.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

What we claim is:

1. A wheel spin processing system for multiple-axle railway vehicles which operates at a succession of time steps, said system comprising, first means for receiving speed and rate of change signals from at least four wheel axle units and for determining which one of the four wheel axle units is rotating at the lowest speed, which is output as an eight-bit speed signal, second means for receiving said eight-bit speed signal and rate of change signals from said first means, comparing said rate of change signals with a speed-varying setpoint value, which when exceeded indicates wheel spin, and for producing a first logical signal when the rate of change signal value is greater than said speed varying set point value, third means for estimating the spin energy value of the lowest speed wheel axle unit and for summing the rate value at the present time step and each successive time step when said first logical variable indicates a spin condition, fourth means for changing the summed rate value to a logical signal which indicates a prolonged spin condition, a fifth means for converting an eight-bit speed signal to a sixteen-bit speed signal, sixth means for calculating the difference between a present sixteen-bit speed signal and a previous sixteen-bit speed signal, seventh means which accepts said sixteen-bit speed signals from said sixth means, and places said sixteen-bit speed signals in memory, shifting said sixteen-bit speed signals backward through 32 storage locations, and discarding the oldest value, said seventh means also summing the speed differences multiplied by an efficiency factor which depends upon whether a wheel spin correction is being made, eighth means for dividing the output of the seventh means by thirty-two, ninth means connected to the fourth and eighth means for holding a modified average speed difference value, tenth means for determining a sixteen-bit speed reference signal, eleventh means for outputting a signal which is the difference of a previous time interval speed value and a present time interval speed value, and twelfth means for converting the sixteen-bit speed reference signal to an eight-bit speed reference signal.

2. The wheel spin processing system as defined in claim 1, wherein a thirteenth means determines if the rate of change signal is less than zero miles per hour per second.

3. The wheel spin processing system as defined in claim 2 wherein said thirteenth means outputs a logical "1" signal if the rate of change signal is less than zero miles per hour per second and otherwise outputs a logical "0" signal.

4. The wheel spin processing system as defined in claim 3, wherein a fourteenth means receives said logical signal from said thirteenth means and also receives a power knockout logical signal and a spin detect logical signal from a spin control correction system and combines said signal from said thirteenth means and said power knockout logical signal and said spin detect logical signal in an OR gate to produce an output logical output signal which is "1" if either of said three signals indicates that a wheel spin correction is occurring and otherwise outputs a logical "0".

5. The wheel spin processing system as defined in claim 4, wherein said fourteenth means receives said logical signals for providing a ninety percent multiplication factor for said seventh means when a logical "0" signal is outputted by said thirteenth means.

6. The wheel spin processing system as defined in claim 1, wherein said first means receives speed and rate of change signals from all the axles on the railway vehicle and determines which of the axles is rotating at the lowest speed, and outputs that speed and acceleration.

7. The wheel spin processing system as defined in claim 1, wherein said second means uses a speed varying setpoint value which, when exceeded, indicates that wheel spin is occurring.

8. The wheel spin processing system as defined in claim 1, wherein said third means sums the acceleration rate of the slowest-turning axle, at each time step when the first logical signal indicates wheel spin, and resets said sum to zero when said first logical signal indicates that wheel spin is not occurring.

9. The wheel spin processing system as defined in claim 1, wherein said fourth means for changing the summed rate value to a logical signal outputs a logical "1" if the summed rate value exceeds a predetermined constant and otherwise outputs a logical "0".

10. The wheel spin processing system as defined in claim 1, wherein said fifth means is an eight to sixteen bit conversion circuit which operates by shifting said eight bits eight times to the left.

11. The wheel spin processing system as defined in claim 1, wherein said sixth means calculates the difference between the present sixteen-bit speed signal and the sixteen-bit speed signal from the previous time step.

12. The wheel spin processing system as defined in claim 1, wherein said seventh means is a speed difference summation function circuit.

13. The wheel spin processing system as defined in claim 1, wherein said eighth means for dividing the output of the seventh means by thirty-two operates by shifting the bits of said output five times to the right.

14. The wheel spin processing system as defined in claim 1, wherein said ninth means holds a modified average speed difference value from thirty-two previous time steps during a significant wheel spin event and provides it as input to said tenth means.

15. The wheel spin processing system as defined in claim 1, wherein said tenth means calculates the vehicle speed, using the output of said ninth means during a significant wheel spin event, and otherwise uses the sixteen-bit speed signal from said fifth means.

16. The wheel spin processing system as defined in claim 1, wherein said eleventh means calculates the difference between the sixteen-bit speed reference signal from said tenth means and the sixteen-bit speed reference signal from said tenth means during the preceding time step.

17. The wheel spin processing system as defined in claim 1, wherein said twelfth means is a sixteen to eight bit speed conversion factor function circuit.

18. The wheel spin processing system as defined in claim 2, wherein said thirteenth means receives said rate of change signal and outputs a logical "1" if said rate of change signal is negative, and otherwise outputs a logical "0".

19. The wheel spin processing system as defined in claim 4, wherein said fourteenth means provides a logical signal which is subsequently used to determine an efficiency factor used for estimating the acceleration before the onset of wheel spin.

* * * * *